United States Patent [19]
Savard

[11] Patent Number: 6,158,931
[45] Date of Patent: Dec. 12, 2000

[54] FRICTION CREATING DEVICE FOR RESTRAINING CARGO MOVEMENT

[76] Inventor: Michel Savard, 275A, rue Saint-Laurent, Saint-Siméon, Québec, Canada, G0T 1X0

[21] Appl. No.: 09/398,053

[22] Filed: Sep. 17, 1999

[51] Int. Cl.[7] .................................. B60P 7/12; B61D 3/16

[52] U.S. Cl. ................................................. 410/40; 410/39

[58] Field of Search .................................. 410/32, 34, 35, 410/39, 40, 155; 206/593, 503, 509; 248/216.1, 216.4, 217.3

[56] References Cited

U.S. PATENT DOCUMENTS

| | | |
|---|---|---|
| 999,828 | 8/1911 | McNaughton . |
| 2,224,432 | 12/1940 | Hoak . |
| 2,341,088 | 2/1944 | Ellis . |
| 2,822,096 | 2/1958 | Buratovich . |
| 3,752,384 | 8/1973 | Siburn . |
| 3,804,028 | 4/1974 | O'Leary et al. . |
| 4,040,589 | 8/1977 | McLay . |
| 4,480,941 | 11/1984 | Gilb et al. . |
| 5,938,157 | 8/1999 | Reiker . |

*Primary Examiner*—D. Glenn Dayoan
*Assistant Examiner*—Scott Carpenter

[57] ABSTRACT

An adapter for increasing the frictional force generated by a spacer interposed between a pair of items. The spacer defining a pair of opposed load bearing surfaces and a pair of spacing surfaces. The adapter includes a relatively flat plate defining a pair of plate surfaces, a pair of opposed contacting edges and a pair of spacing edges. A fixing component is provided for fixing the plate to one of the spacing surfaces of the spacer. A set of friction increasing teeth extend from at least one of the contacting edges for increasing the friction coefficient of the contacting edge with an item. The plate is configured and sized so that the friction enhancing teeth protrude from one of the load bearing surfaces when the plate is mounted on the spacer. In one embodiment, the adapter also includes an auxiliary friction enhancing segment for enhancing the friction between the adapter and contacting items. The auxiliary friction enhancing segment includes an auxiliary section having a generally "L" shaped configuration and extending substantially perpendicularly from one of the contacting edges so that the adapter with its auxiliary section has a generally "U" shaped cross sectional configuration. The "L" shaped auxiliary section defines a first auxiliary segment extending substantially perpendicularly from one of the contacting edges. The first auxiliary segment is configured and sized so as to override one of the load bearing surfaces. The first auxiliary segment bends integrally and substantially perpendicularly into a second auxiliary segment. The second auxiliary segment defines a pair of second auxiliary segment contacting edges. At least one of the second auxiliary segment contacting edges is provided with corresponding friction teeth extending therefrom. In yet another embodiment, an abutment plate extends substantially perpendicularly from the first auxiliary segment.

16 Claims, 4 Drawing Sheets

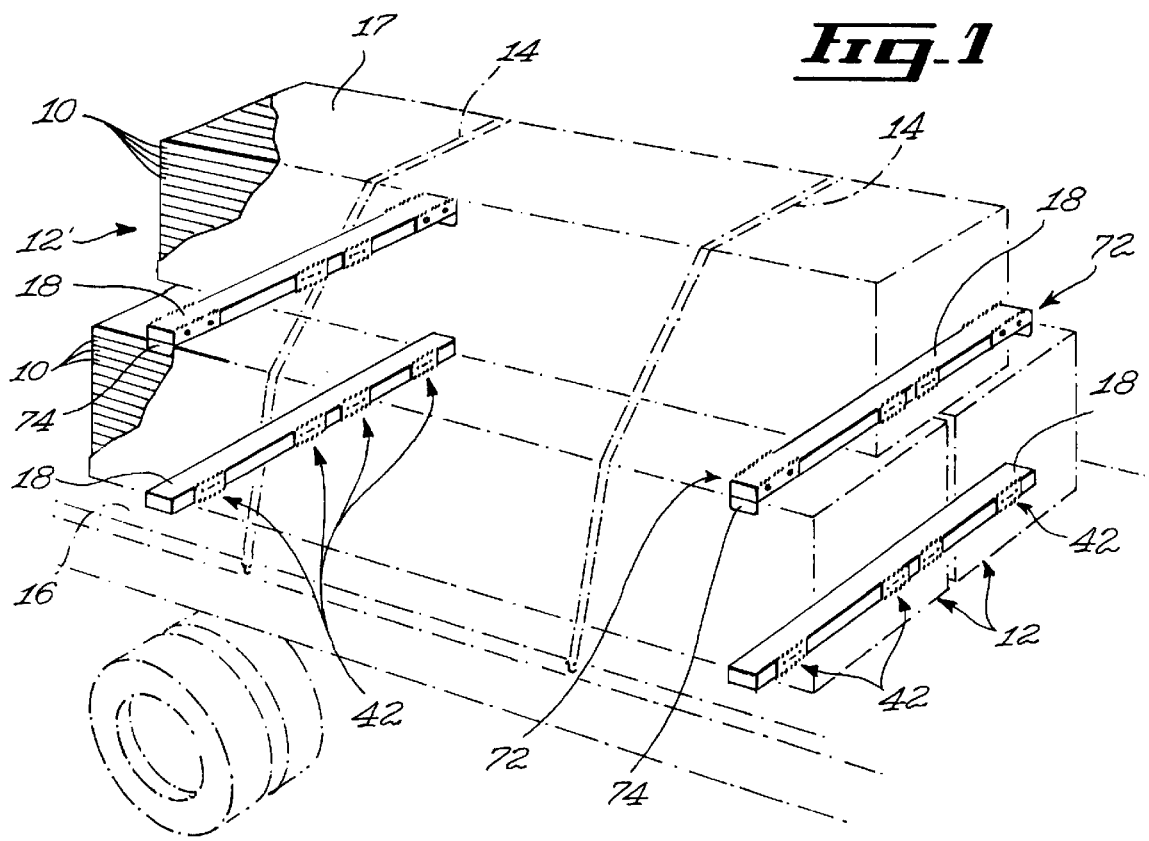
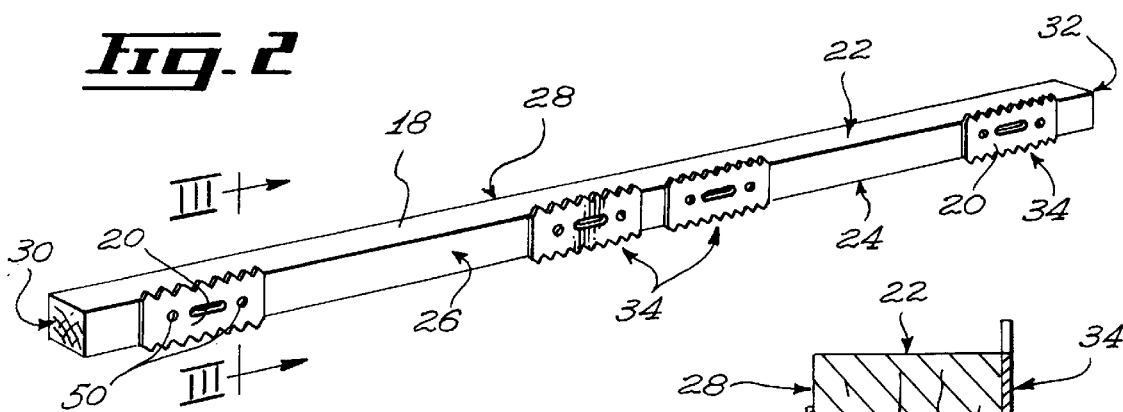
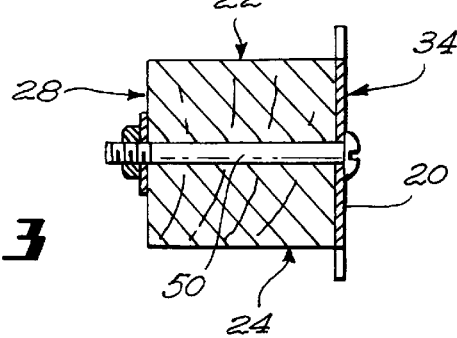

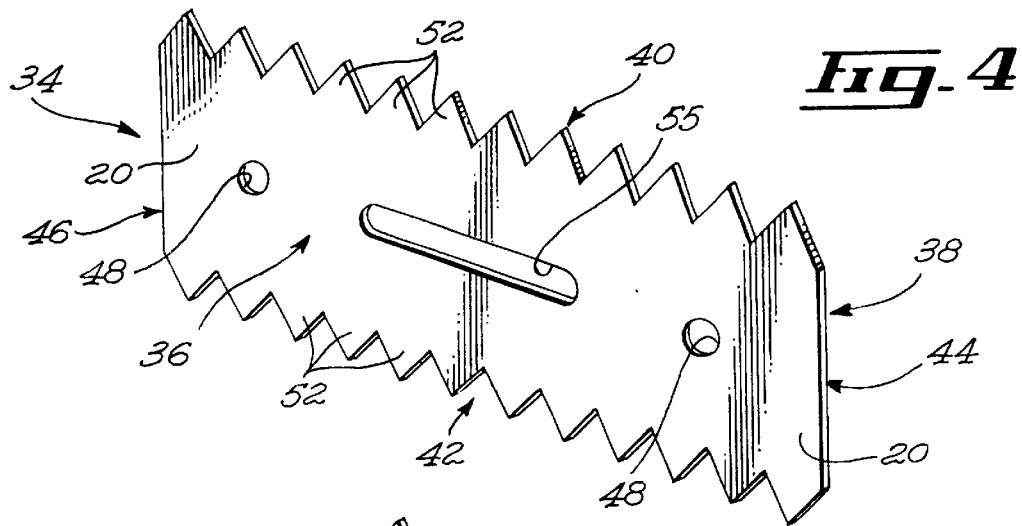
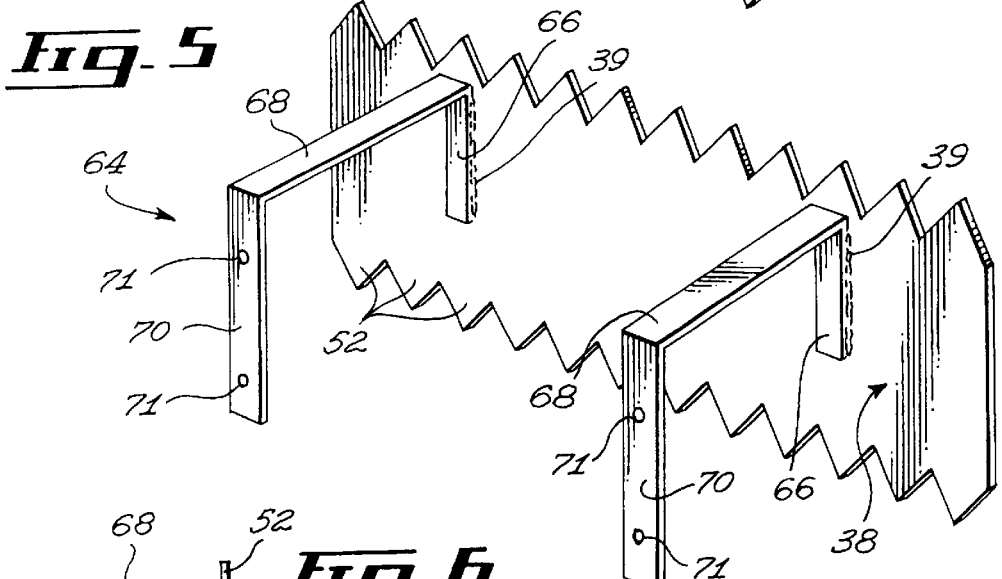
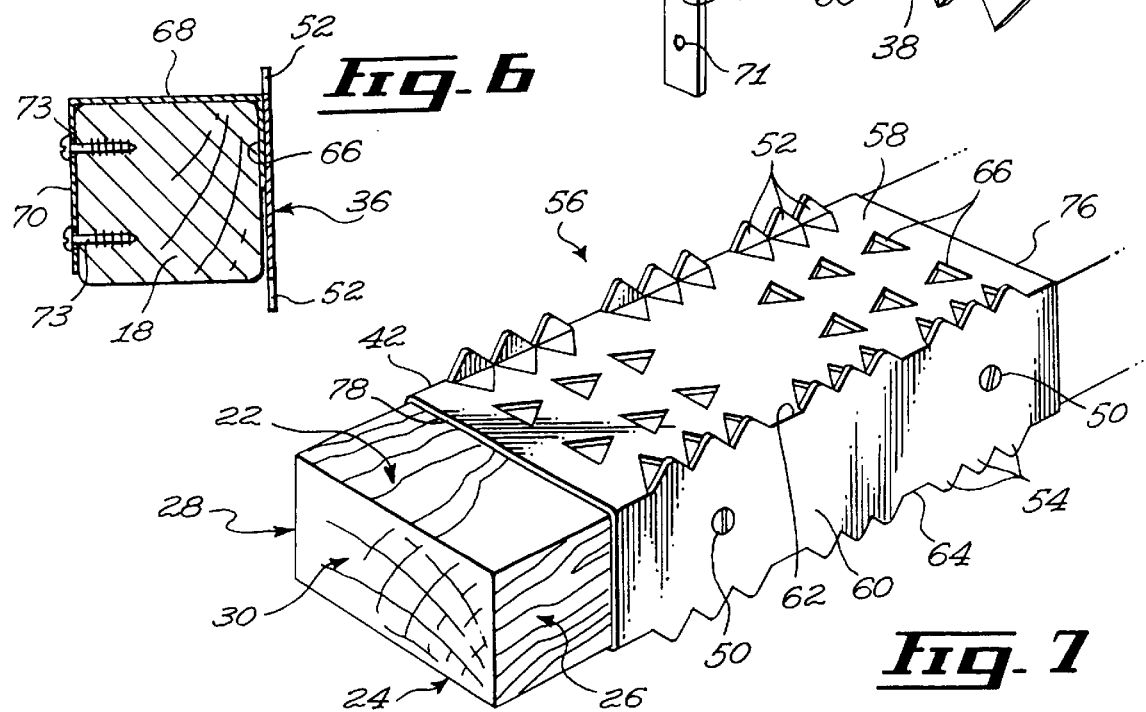

FRICTION CREATING DEVICE FOR RESTRAINING CARGO MOVEMENT

FIELD OF THE INVENTION

The present invention relates to the field of transportation equipment and is particularly concerned with a friction-creating device for restraining cargo movement.

BACKGROUND OF THE INVENTION

There exists a plurality of situations wherein it is desirable to restrain the relative movement between a given vehicle transporting cargo and the cargo itself. Examples of such situations include situations wherein vehicles having transportation platforms such as trucks and trains are used for transporting bundled elongated or board shaped articles such as dressed lumber, packaged lumber, plywood boards, gypsum boards or the like.

Indeed, such elongated or board shaped materials is usually offered by manufacturers and shippers in strapped bundles unitized for securement as a single item of cargo. The bundles are usually positioned on the carrying beds in a stacked relationship relative to each other so as to form several tiers.

Conventional spacers usually vertically separate the generally horizontally disposed tiers from each other. The conventional spacers usually consist of an elongated piece of lumber having a generally rectangular cross sectional configuration positioned transversally relative to the bundles. Commonly, each spacer has a 2">4" cross sectional dimensioning so as to allow insertion of the tines of a lift truck between the stacked bundles in order to facilitate handling thereof.

Once the tiers of bundles are stacked, a tie-down device typically taking the form of tie-down strap is used to secure the stacked bundles on the transportation platform in order to prevent the load from becoming detached therefrom.

One of the problems associated with this conventional method of securing stacked bundles to a transportation platform is that even though the tie-down strap is initially adequately tensioned so as to prevent the load from falling off the platform, during the transportation process the load subjected to vibration as well as acceleration forces tends to loosen the strap creating a potentially dangerous situation. Indeed, most conventional tie-down devices have a tendency to lose their efficiency during the transportation process. Furthermore, over tightening of the tie-down device in an attempt to compensate for such loosening of the tie-down device often results in damaging of both the tie-down device and of the load being carried.

The tendency for loads to fall-off moving transportation platforms is exacerbated in winter like conditions when snow and ice tends to accumulate between the spaced tiers making them more susceptible to slip away from each other. Furthermore, some cargo such as processed wood is often protected from direct contact with adjacent hard surfaces and from the detrimental effects of environmental factor such as rain by covers such as tarpaulins or composite covers made of woven fibers sandwiched between polyethylene layers. The protecting covers further increase the risk of having the stacked cargo fall off the transportation platform.

Stacked cargo falling off from a transportation platform may not only damage the platform and the cargo itself resulting in considerable monetary loss but it may also potentially lead to serious injuries. For example, stacked lumber falling from a moving truck platform may crush adjacent vehicle or fall onto the roadway potentially leading to serious vehicle collisions.

Accordingly, there exist a need for a restraining device that will restrain relative cargo movement between the cargo and the transportation vehicle so as to reduce the risk of having the cargo fall off from the vehicle. More specifically, there exists a need for a device that will reduce the risk of having stacked piles separated by spacers move relative to each other about a relatively horizontal geometrical plane.

Advantages of the present of the present invention include the fact that the proposed device reduces relative movement between stacked piles of material during transportation of the latter when the cargo is subjected to acceleration forces. Also, the proposed device is specifically configured so as to be readily mounted on conventional spacers used for spacing tiers of stacked material such as conventional elongated wood spacers having 2"×4" cross sectional dimensions.

Furthermore, the proposed device is specifically configured so as to provide additional frictional forces between adjacent tiers of stacked material without causing excessive damage to the material at the point of contact between the proposed device and the material. Also, the proposed device is relatively lightweight so as not to unduly increase the overall weight of the transported load. Furthermore the proposed device is designed so as to be manufacturable using relatively simple conventional method of manufacturing so as to provide a device that is economically feasible, long lasting and relatively trouble free in operation.

In accordance with a one embodiment of the invention there is provided an adapter for increasing the frictional force generated by a spacer interposed between a pair of items, the spacer defining a pair of opposed load bearing surfaces and a pair of spacing surfaces, the adapter comprising a relatively flat plate, the plate defining a pair of plate surfaces, a pair of opposed contacting edges and a pair of spacing edges;

a fixing means mounted on the plate for fixing the plate to one of the spacing surfaces of the spacer;

a friction enhancing means extending from at least a chosen one of the contacting edges for increasing the friction coefficient of the chosen contacting edge; the plate being configured and sized so that the friction enhancing means protrudes from one of the load bearing surfaces when the plate is mounted on the spacer.

Conveniently, the friction enhancing means extends from both of the contacting edges, the plate being configured and sized so that the friction enhancing means protrudes from both the load bearing surfaces when the plate is mounted on the spacer.

Preferably, friction enhancing means includes at least one friction tooth extending from each of the contacting edges. Conveniently, the friction tooth defines a friction tooth apex, the friction tooth apex having a generally rounded contour. Preferably, the friction tooth has a friction tooth height, the friction tooth height having a value substantially in the range of one quarter of an inch.

In one embodiment, the fixing means includes at least one fixing aperture extending through the plate and a fixing component, the fixing component having an elongated stem and an abutment head; the abutment head being configured for abuttingly contacting one of the plate surfaces while the stem is configured so as to extend through the fixing aperture and frictionally engage the spacer.

In another embodiment, the fixing means includes at least one toothed aperture extending through the plate, the toothed aperture having a peripheral edge, at least one aperture tooth extending substantially perpendicularly from the peripheral edge of the toothed aperture, the aperture tooth being configured so as to be able to frictionally engage of the spacing surfaces when the plate abuttingly contacts the spacer.

In yet another embodiment, the fixing means includes at least one fixing bracket solidly anchored to the plate, the fixing bracket having a bracket first segment attached to one of the plate surfaces and extending generally parallel to the latter; the bracket first segment bending integrally into a generally perpendicular bracket second segment; the bracket second segment, in turn, bending integrally into a generally perpendicular bracket third segment; the fixing bracket defining a generally "C"-shaped cross-sectional configuration forming a concavity, the concavity being configured and sized so as to be substantially fittingly mounted over the spacer with the bracket second segment abuttingly contacting one of the load bearing surfaces.

In an alternative embodiment, the adapter further includes an auxiliary friction enhancing means for enhancing the friction between the adapter and contacting items, the auxiliary friction enhancing means including an auxiliary section having a generally "L" shaped configuration and extending substantially perpendicularly from a selected one of the contacting edges so that the adapter with its auxiliary section has a generally "U" shaped cross sectional configuration; the "L" shaped auxiliary section defining a first auxiliary segment extending substantially perpendicularly from selected contacting edge; the first auxiliary segment being configured and sized so as to override one of the load bearing surfaces, the first auxiliary segment bending integrally and substantially perpendicularly into a second auxiliary segment; the second auxiliary segment defining a pair of second auxiliary segment contacting edges; at least one of the second auxiliary segment contacting edges being provided with corresponding friction teeth extending therefrom.

In another alternative embodiment of the invention, an abutment plate extends substantially perpendicularly from the first auxilliary segment.

Preferably, the second auxiliary segment is configured and sized so as to be substantially similar to the plate. Conveniently, the first auxiliary segment is provided with at least one auxiliary toothed aperture extending therethrough, the auxiliary toothed aperture having at least one auxiliary aperture tooth extending substantially perpendicularly from its peripheral edge.

There is also provided a blank for forming an adapter, the blank comprising a flat piece of substantially rigid material, the flat piece having a generally rectangular configuration defining a pair of longitudinal peripheral edges and a pair of transversal peripheral edges; the longitudinal peripheral edges being provided with serrations formed thereon; a pair of serrated fold lines extending longitudinally across the flat piece of material in a parallel relationship with the longitudinal peripheral edges.

The invention also includes a spacer for spacing stacked items, the spacer comprising a spacing block, the spacing block defining a pair of opposed load bearing surfaces and a pair of spacing surfaces; a relatively flat plate, the plate defining a pair of plate surfaces, a pair of opposed contacting edges and a pair of spacing edges; a fixing means mounted on the plate for fixing the plate to one of the spacing surfaces of the spacing block; a friction enhancing means extending from at least a chosen one of the contacting edges for increasing the friction coefficient of the chosen contacting edge; the plate being configured and sized so that the friction enhancing means protrudes from one of the load bearing surfaces when the plate is mounted on the spacing block.

In one embodiment, the friction enhancing means extends from both of the contacting edges, the plate being configured and sized so that the friction enhancing means protrudes from both the load bearing surfaces when the plate is mounted on the spacing block.

Preferably, the friction enhancing means includes at least one friction tooth extending from each of the contacting edges.

BRIEF DESCRIPTION OF THE DRAWINGS

Embodiments of the invention will now be described, by way of example, in reference to the following drawings in which:

FIG. 1, in a perspective view, illustrates a set of devices in accordance with the present invention mounted on conventional spacer components used for vertically spacing a top bundle of timber from a pair of base bundles of timber, the bundles of timber being secured to a conventional transportation platform.

FIG. 2, in a perspective view, illustrates a pair of devices in accordance with a first embodiment of the present invention mounted on a conventional spacer component.

FIG. 3, in a cross sectional view, illustrates a device in accordance with the first embodiment of the present invention mounted on a conventional spacer component.

FIG. 4, in a perspective view, illustrates a device in accordance with a first embodiment of the present invention.

FIG. 5, in a perspective view, illustrates a device in accordance with a first embodiment of the present invention having an alternative fixing component.

FIG. 6, in a cross-sectional view illustrates the device shown in FIG. 5 mounted on a conventional spacer component FIG. 7, in a perspective view, illustrates a device in accordance with a second embodiment of the present invention mounted on a conventional spacer component.

DETAILED DESCRIPTION OF THE DRAWINGS

Figure 8:
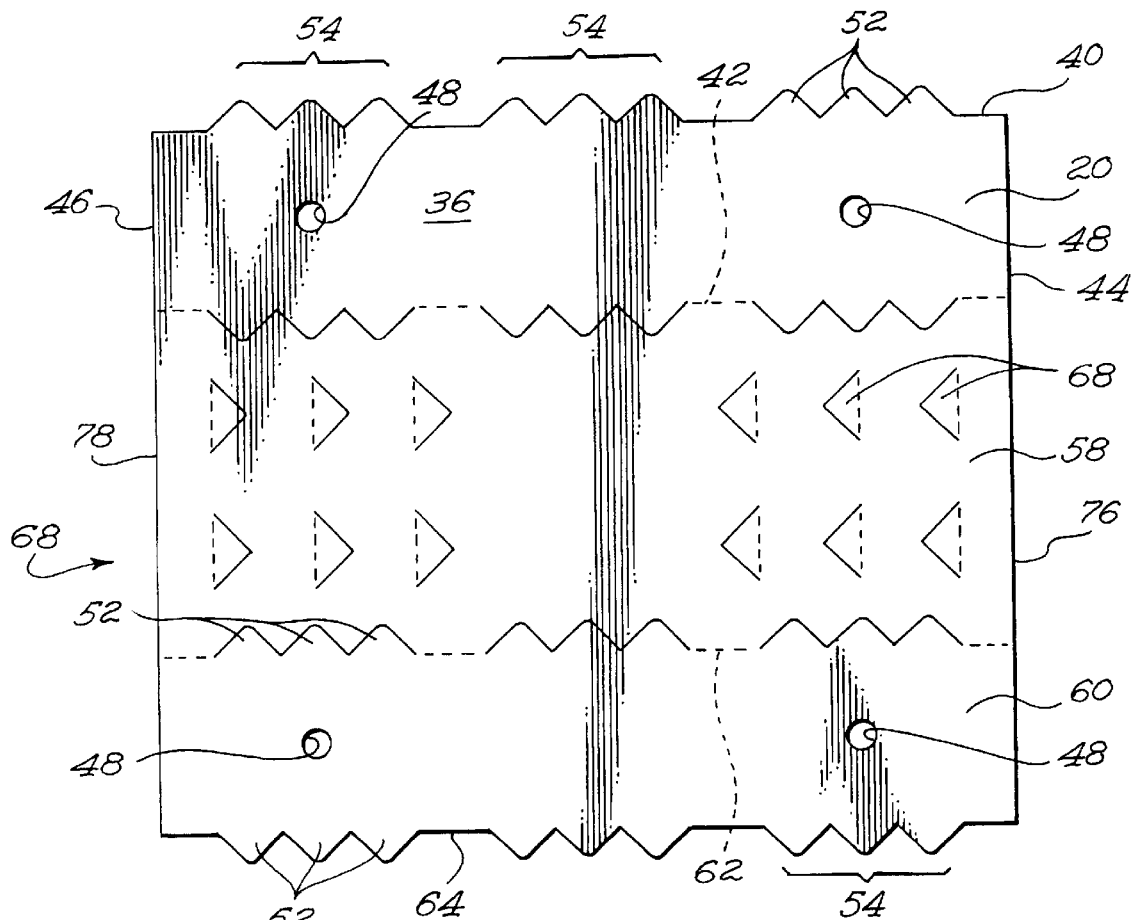
FIG. 8, in a top view, illustrates a blank used for forming the device shown in FIG. 7.

Referring to FIG. 1 there is shown a set of elongated components such as strips 10 of lumber strapped in bundles 12 by conventional bundle straps or any other suitable means. The bundles 12 are mounted on a conventional transportation platform 16. The bundles 12 are either positioned in side by side relationship or stacked on top of each other so as to form tiers. In the example shown in FIG. 1, a pair of base bundle 12 are rested on the transportation platform 16 and a top bundle 12' is stacked on the base bundles 12. The bundles 12, 12' are preferably protected against environmental factors such as rain or the like by a protective sheet 17 made of a protective material such as a polymeric resin or any other suitable material.

The bundles 12, 12' are maintained in a spaced relationship relative to an adjacent supporting surface such as the surface of an underlying bundle or the supporting surface of the transportation platform 16 by conventional spacers 18. Typically, the height of the spacers 18 is proportioned to the necessity for inserting the tines of a lift truck between the bundles and their adjacent supporting surface.

Conventionally, as illustrated more specifically in FIG. 2, each spacer 18 consists of an elongated piece of material such as wood having a 2"×4" cross-sectional dimensioning. The bundles 12, 12' are secured to the transportation platform 16 by conventional tie-down material such as tensioned tie-down straps 14 extending transversally across the transportation platform 16 and over the bundles 12.

It should be understood that FIG. 1 only illustrates one possible context of use of the present invention. The present invention could be used to secure any type of cargo including bundles 12 made of other elongated or board shaped components such as pieces of dressed lumber, packaged lumber, boards of plywood, boards of gypsum or any other material.

Also, the bundles may be formed by other means than bundle straps as long as it provides for unitized securement of the article as single items of cargo. Also, the transportation platform 16 and the tie-down components 14 could take any suitable configuration. Furthermore, the spacers 18 could also take any suitable configuration as long as they provide a means for maintaining an article in a spaced relationship relative to its supporting surface.

As shown more specifically in FIG. 2, each spacer 18 typically defines a first load bearing surface 22 and an opposed second load bearing surface 24. The spacer 18 also defines a first spacing surface 26 and a second spacing surface 28. Preferably, the spacer 18 has a generally elongated configuration defining a pair of longitudinally opposed end surfaces 30, 32.

FIGS. 1 through 4 illustrate a device 34 in accordance with a first embodiment of the present invention. The device 34 includes a relatively flat and preferably elongated plate 20 defining a first plate surface 36 and an opposed second plate surface 38. The plate 20 further defines a first contacting edge hereinafter referred to as first longitudinal edge 40 and a transversally opposed second contacting edge hereinafter referred to as second longitudinal edge 42.

The plate 20 further defines a first spacing edge hereinafter referred to as first end edge 44 and a longitudinally opposed second spacing edge herein after referred to as second end edge 46. In a preferred embodiment of the invention, the distance between the first longitudinal edge 40 and the second longitudinal edge 42 corresponds substantially to the width of the first or second spacing surfaces 26, 28 and thus to the distance between the first and second load bearing surfaces 22, 24.

The device 34 also includes a fixing means for fixing the plate to the spacer 18. The fixing means typically includes at least one fixing aperture 48 extending through the plate 20 and a fixing component such as a screw or a bolt 50 extending through the plate 20 and at least partially through the spacer 18. Preferably, each device 34 has two fixing apertures 48 and corresponding fixing components 50 longitudinally aligned and spaced relative to each other.

The device 34 further includes a friction enhancing means for enhancing the friction between the device 34 and contacting surfaces contacting the first and/or second load bearing surfaces 22, 24. Preferably, the friction enhancing means takes the form of a set of friction teeth 52 extending from the first longitudinal edge 40 and/or second longitudinal edge 42 of the device 34.

The friction teeth 52 are configured and sized so as to protrude from the corresponding first load bearing surface 22 and/or second load bearing surface 24 when the device 34 is mounted on the spacer 18. In one embodiment of the invention, the first longitudinal edge 40 and the second longitudinal edge 42 are intermittently serrated with spaced groups 54 of friction teeth 52.

Typically, the friction teeth 52 are configured and sized so that their respective apex protrudes from an adjacent load bearing surface 22 or 24 by approximately ¼". Also, preferably the contour of the apex portion of the teeth 52 is given a generally rounded configuration so as to prevent the friction teeth 52 from damaging the material, which they contact. Typically, the contour of the apex of each friction teeth 50 has a radius of curvature substantially in the range of 0.05".

Each device 34 is also preferably provided with at least one prehension slot 55 extending therethrough. The prehension slot 55 is adapted to facilitate manipulation of the device 34 and also reduce the overall weight of the device 34. Each plate 20 is preferably made of an integrally extending piece of relatively rigid yet lightweight material such as aluminum.

The plate 20, the friction teeth 52, the fixing apertures 48 and the prehension slot 55 may all be formed using a relative simple punch and die manufacturing process. It should be understood that the device 34 may be formed out of other materials and using other manufacturing process such as out of polymeric resin using a conventional injection molding process without departing from the scope of the present invention.

As illustrated in FIGS. 5 and 6, the fixing means may alternativelly take the form of at least one and preferably two fixing brackets 64 solidly anchored to one of the plate surfaces 36, 38 by weld lines 39 or any other suitable means. Each fixing bracket 64 preferably has a bracket first segment 66 attached to the second plate surface 38 and extending generally parallel to the latter.

The bracket first segment 66 bends integrally into a generally perpendicular bracket second segment 68. The bracket second segment 68, in turn, bends integrally into a generally perpendicular bracket third segment 70. Each fixing bracket 64 thus defines a generally "C"-shaped cross-sectional configuration. The "C"-shaped cross-sectional configuration defines a concavity configured and sized so as to be substantially fittingly over a spacer 18 with the bracket second segment 68 abuttingly contacting the first load bearing surface 22. Bracket fixing apertures 71 preferably extend through the third segment 70. Each bracket fixing aperture 71 is configured and sized for receiving a fixing component such as a screw or bolt 73.

The fixing means may optionally further take the form of at least one toothed aperture (not shown) having at least one aperture tooth extending substantially perpendicularly from the peripheral edge of the toothed aperture so as to penetrate through the surface of the spacer 18.

It should be understood that altough some embodiments of the fixing means have been hereinabove described in details, the fixing means for fixing the device 34 to the spacer 18 may take any suitable form such as a set of straps surrounding both the spacer 18 and the device 34 or any other suitable means without departing from the scope of the present invention.

FIGS. 7 and 8, illustrate a device 56 in accordance with another embodiment of the present invention. The device 56 is substantially identical to the device 34 and similar reference numerals will be used to denote similar components. One of the main differences between the devices 56 and the device 34 resides in the presence of an auxiliary friction enhancing means for enhancing the friction between the device 56 and objects contacting the latter.

The auxiliary friction enhancing means preferably takes the form of an auxiliary section having a generally "L"-shaped cross-sectional configuration and extending substantially perpendicularly from one of the first or second longitudinal edges 40, 42 so that the device 56 with its auxiliary section has a generally "U"-shaped cross-sectional configuration.

The generally "L"-shaped auxiliary section defines a first auxiliary segment 58 extending substantially perpendicularly from one of the longitudinal edges 40, 42. The first auxiliary segment 58 is configured and sized so as to substantially fittingly override one of the load bearing surfaces 22, 24. In other words, the width of the first auxiliary segment 58 is substantially similar to the width of the first or second load bearing surfaces 22, 24.

The first auxiliary segment 58 bends integrally and substantially perpendicularly into a second auxiliary segment 60. The second auxiliary segment 60 defines a pair of second auxiliary segment longitudinal edges 62, 64. The second auxiliary segment 60 is configured and sized so as to be substantially similar to the device 34. The second auxiliary segment longitudinal edges 62, 64 are preferably provided with corresponding friction teeth 54 extending therefrom.

Optionally, the first auxiliary segment 58 may be provided at least one toothed aperture 66 having at least one aperture tooth extending substantially perpendicularly from the peripheral edge of the toothed aperture 66 so as to penetrate through the surface of the spacer 18.

Referring to FIG. 8, there is shown a blank 68 used for forming a device 56. The blank 68 may be formed by a conventional metal stamping process or any other suitable means. The blank 68 is then folded about the longitudinal edges 42, 62 so as to assume the "C"-shaped cross-sectional configuration of the device 56.

Figure 9:
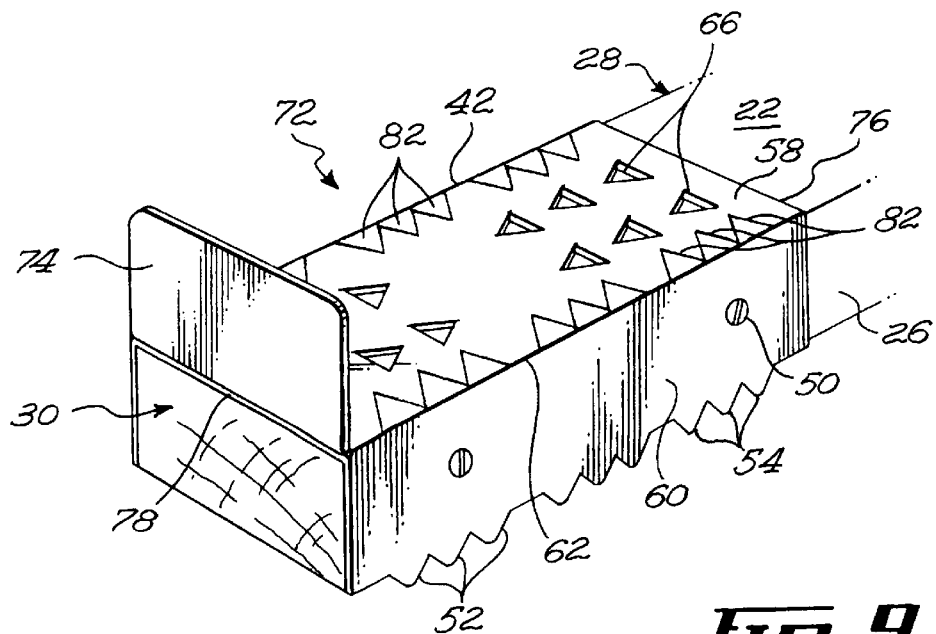
FIG. 9, in a perspective view, illustrates a device in accordance with a third embodiment of the present invention mounted on a conventional spacer component.
Figure 10:
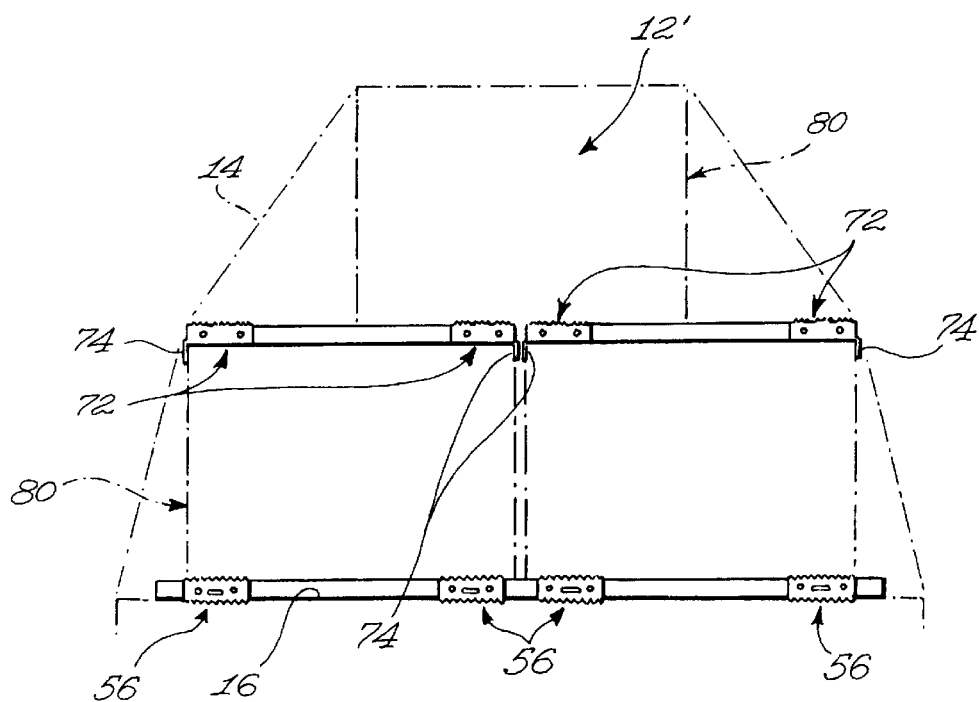
FIG. 10, in an elevational view illustrates a set of devices in accordance with the present invention mounted on conventional spacer components used for vertically spacing a top bundle of timber from a pair of base bundles of timber, the bundles of timber being secured to a conventional transportation platform.

Turning now to FIG. 9, there is shown a device 72 in accordance with yet another embodiment of the present invention. The device 72 is substantially similar to the device 56 and similar reference numerals will be used to denote similar components. One of the main differences between the devices 72 and 56 resides in the presence of an abutment plate 74 extending substantially perpendicularly from one of the end edges 76, 78 of the first auxiliary segment 58 in a direction leading away from the second auxilliary segment 60 and the plate 20. As illustrated in FIG. 10 each abutment plate 74 is configured, sized and positionned for abutment against a corresponding lateral surface 80 of a bundle 12 or 12'.

Another difference between the devices 72 and 56 resides in that teeth 52 only extend from the peripheral edges 40 and 64 in a direction opposite that of the abutment plate 74. The longitudinal edges 42 and 62 are preferrably deprived of teeth 52 and define generally smooth outer surfaces.

FIG. 9 illustrates an embodiment of the invention wherein the device 72 is manufactured using a blank substantially similar to that used for forming a device 56. The longitudinal edges 42 and 62 consequently define patterned grooves 82 on their respective surfaces that correspond to unfolded teeth made by the punch matrix used for forming the blank.

In use, at least one and preferably four devices 34, 56 or 72 are fixed to one or both of the of the spacing surfaces 26, 28 of a conventional spacer 18 by the fixing means. The spacers 18 with the devices 34, 56 or 72 mounted thereon are then positioned transversally across the ties. The friction teeth 52 are adapted to penetrate partially through the surface of adjacent ties thus increasing the overall friction co-efficient and restraining the ties from moving relative to each other.

Preferably, the device 72 is used in situations wherein the spacer 18 is positionned between bundles 12 and 12'. The spacers 34 or 56 are used in situations wherein the spacer 18 is positionned between a bundle 12 and a supporting surface other then another bundle 12. The use of a device 72 instead of a device 34 or 56 between adjacent bundles 12 and 12' is preferred to prevent teereing of the cover sheet 17 by the teeth 52., Indeed, the protective sheet 17 typically protectivelly covers only the top and lateral surfaces of thre bundles 12, 12' leaving the undersurface of the bundles 12, 12' uncovered. This may prove to be particularly important in certain industrial settings wherein industry officials have requested that the cover sheet 17 remain intact. When the device 72 is used the teeth 52 grip into the undersurface of the overlying bundle 12' while the abutment plates 74 prevent latewral displacement of the spacer 18 relative to the underlying bundle 12.

Figure 11:
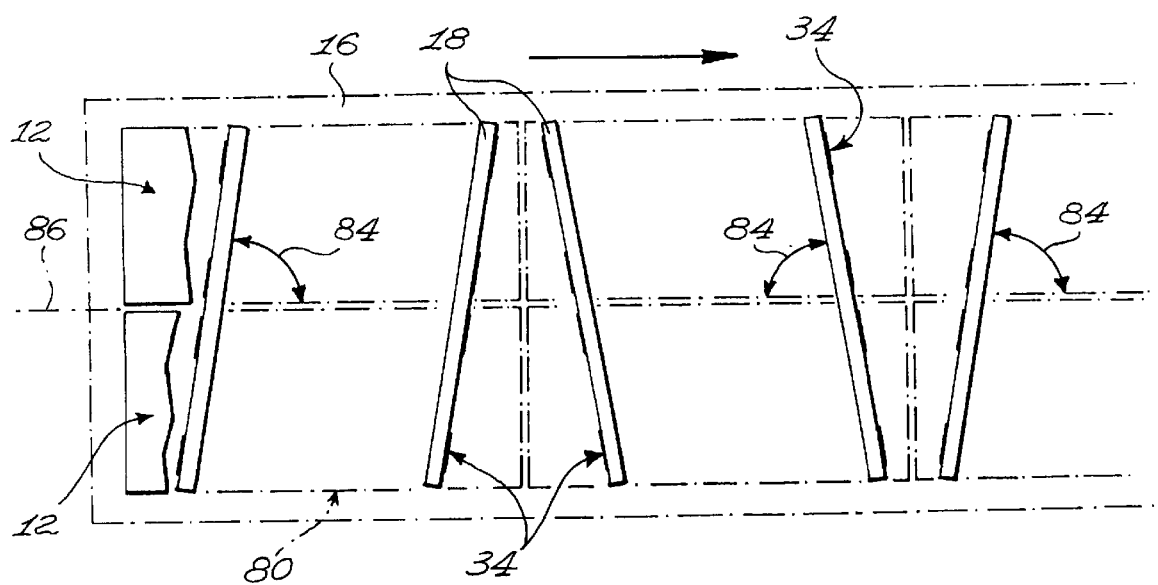
FIG. 11, in a schematic top view with sections taken out illustrate a preferred positioning of devices in accordance with the present invention when used for securing stacked bundles.

Referring now more specifically to FIG. 11, there is shown in a top view a preferred positioning of the friction creating devices 34, 54 or 72. The devices 34,54 or 72 are strategically positioned so as to restrain relative movement between adjacent bundles 12 and relative movement between the bundles 12 and a support platform 16 in various directions.

The devices 34,54 or 72 are mounted on are aligned on a given spacer 18 and so as to form rows on the latter. The spacers 18 are angled by an angle 82 relative to a general direction of travel of the moving platform 16 indicated by arrow 84. Also, preferably, the rows are grouped in pairs forming tandems with adjacent tandems diverging away from each other in a direction perpendicular to the direction of travel 84.

The embodiments of the invention in which an exclusive privilege or property is claimed are defined as follows:

1. An adapter for increasing the frictional force generated by a spacer interposed between a pair of items, said spacer defining a pair of opposed load bearing surfaces and a pair of spacing surfaces, said adapter comprising:

a relatively flat plate, said plate defining a pair of plate surfaces, a pair of opposed contacting edges and a pair of spacing edges;

a fixing means mounted on said plate for fixing said plate to one of said spacing surfaces of said spacer;

a friction enhancing means extending from at least a chosen one of said contacting edges for increasing the friction coefficient of said chosen contacting edge;

said plate being configured and sized so that said friction enhancing means protrudes from one of said load bearing surfaces when said plate is mounted on said spacer.

2. An adapter as recited in claim 1 wherein said friction enhancing means extends from both of said contacting edges, said plate being configured and sized so that said friction enhancing means protrudes from both said load bearing surfaces when said plate is mounted on said spacer.

3. An adapter as recited in claim 2 wherein said friction enhancing means includes at least one friction tooth extending from each of said contacting edges.

4. An adapter as recited in claim 3 wherein said friction tooth defines a friction tooth apex, said friction tooth apex having a generally rounded contour.

5. An adapter as recited in claim 4 wherein said friction tooth has a friction tooth height, said friction tooth height having a value substantially in the range of one quarter of an inch.

6. An adapter as recited in claim 2 wherein said fixing means includes at least one fixing aperture extending through said plate and a fixing component, said fixing component having an elongated stem and an abutment head; said abutment head being configured for abuttingly contacting one of said plate surfaces while said stem is configured so as to extend through said fixing aperture and frictionally engage said spacer.

7. An adapter as recited in claim 2 wherein said fixing means includes at least one fixing bracket solidly anchored to said plate, said fixing bracket having a bracket first segment attached to one of said plate surfaces and extending generally parallel to the latter; said bracket first segment bending integrally into a generally perpendicular bracket second segment; said bracket second segment, in turn, bending integrally into a generally perpendicular bracket third segment; said fixing bracket defining a generally "C"-shaped cross-sectional configuration forming a concavity, said concavity being configured and sized so as to be substantially fittingly mounted over said spacer with said bracket second segment abuttingly contacting one of said load bearing surfaces.

8. An adapter as recited in claim 1 further comprising an auxiliary friction enhancing means for enhancing the friction between said adapter and contacting items, said auxiliary friction enhancing means including an auxiliary section having a generally "L" shaped configuration and extending substantially perpendicularly from a selected one of said contacting edges so that said adapter with its auxiliary section has a generally "U" shaped cross sectional configuration; said "L" shaped auxiliary section defining a first auxiliary segment extending substantially perpendicularly from selected contacting edge; said first auxiliary segment being configured and sized so as to override one of said load bearing surfaces, said first auxiliary segment bending integrally and substantially perpendicularly into a second auxiliary segment; said second auxiliary segment defining a pair of second auxiliary segment contacting edges; at least one of said second auxiliary segment contacting edges being provided with corresponding friction teeth extending therefrom.

9. An adapter as recited in claim 8 further comprising an abutment plate extending substantially perpendicularly from said first auxilliary segment.

10. An adapter as recited in claim 8 wherein said second auxiliary segment is configured and sized so as to be substantially similar to said plate.

11. An adapter as recited in claim 8 wherein said first auxiliary segment is provided with at least one auxiliary toothed aperture extending therethrough, said auxiliary toothed aperture having at least one auxiliary aperture tooth extending substantially perpendicularly from its peripheral edge.

12. A spacer for spacing stacked items, said spacer comprising a spacing block, said spacing block defining a pair of opposed load bearing surfaces and a pair of spacing surfaces;

a relatively flat plate, said plate defining a pair of plate surfaces, a pair of opposed contacting edges and a pair of spacing edges;

a fixing means mounted on said plate for fixing said plate to one of said spacing surfaces of said spacing block;

a friction enhancing means extending from at least a chosen one of said contacting edges for increasing the friction coefficient of said chosen contacting edge;

said plate being configured and sized so that said friction enhancing means protrudes from one of said load bearing surfaces when said plate is mounted on said spacing block.

13. A spacer as recited in claim 12 wherein said friction enhancing means extends from both of said contacting edges, said plate being configured and sized so that said friction enhancing means protrudes from both said load bearing surfaces when said plate is mounted on said spacing block.

14. A spacer as recited in claim 13 wherein said friction enhancing means includes at least one friction tooth extending from each of said contacting edges.

15. A spacer as recited in claim 12 further comprising an auxiliary friction enhancing means for enhancing the friction between said adapter and contacting items, said auxiliary friction enhancing means including an auxiliary section having a generally "L" shaped configuration and extending substantially perpendicularly from a selected one of said contacting edges so that said adapter with its auxiliary section has a generally "U" shaped cross sectional configuration; said "L" shaped auxiliary section defining a first auxiliary segment extending substantially perpendicularly from selected contacting edge; said first auxiliary segment being configured and sized so as to override one of said load bearing surfaces, said first auxiliary segment bending integrally and substantially perpendicularly into a second auxiliary segment; said second auxiliary segment defining a pair of second auxiliary segment contacting edges; at least one of said second auxiliary segment contacting edges being provided with corresponding friction teeth extending therefrom.

16. A spacer as recited in claim 15 further comprising an abutment plate extending substantially perpendicularly from said first auxilliary segment.

* * * * *